(No Model.)
G. W. PAYNE.
VEHICLE SEAT.
No. 327,584. Patented Oct. 6, 1885.
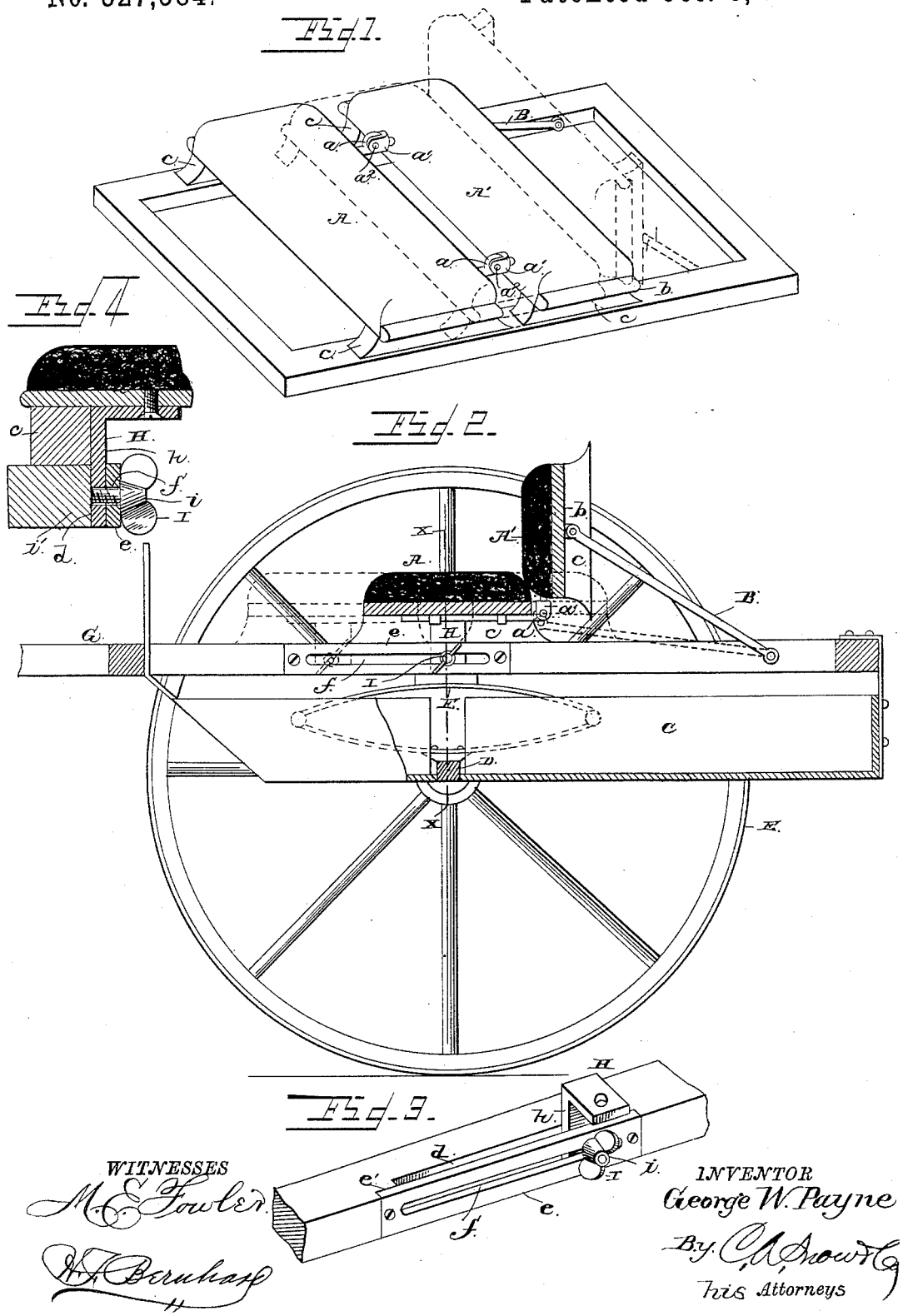
INVENTOR
George W. Payne
By his Attorneys

UNITED STATES PATENT OFFICE.

GEORGE W. PAYNE, OF LITTLE NECK, NEW YORK.

VEHICLE-SEAT.

SPECIFICATION forming part of Letters Patent No. 327,584, dated October 6, 1885.

Application filed August 14, 1885. Serial No. 174,396. (No model.)

*To all whom it may concern:*

Be it known that I, GEORGE W. PAYNE, a citizen of the United States, residing at Little Neck, in the county of Queens and State of New York, have invented new and useful Improvements in Vehicle-Seats, of which the following is a specification, reference being had to the accompanying drawings.

My invention relates to improvements in vehicle-seats, especially adapted for use in connection with two-wheeled vehicles of the road-cart class; and the novelty consists in the construction, combination, arrangement, and adaptation of the various parts for service, substantially as hereinafter fully set forth, and pointed out in the claims.

My invention has, primarily, for its object to provide a seat which shall be capable of use either as a double seat or as a single seat and back.

My invention has, further, for its object to throw the weight of the seats, when the device is used as a double seat in vehicles of the road-cart class, on both sides of the vehicle-axle, thus relieving the various parts from undue strain when the vehicle is loaded to its fullest capacity.

A further object of my invention is to provide a seat which shall combine simplicity, strength, and durability of construction with cheapness of manufacture, effectiveness of operation, adaptability to vehicles of different classes and to road-carts at present in use, and which shall add to the comfort of the occupants of the vehicle.

I have shown an embodiment of my invention in the accompanying drawings, which form a part of this specification, and in which Figure 1 is a perspective view of a vehicle-seat detached from a vehicle, showing in full lines the device adapted for use as a double seat, and in dotted lines one of the seats thrown up and adapted for use as a back. Fig. 2 is a central longitudinal section through the device in position upon a vehicle of the road-cart class, the device being shown in full lines as a combined seat and back and in dotted lines as a double seat. Figs. 3 and 4 are views in detail of parts of my improvements.

Like letters of reference denote like or corresponding parts in all the figures of the drawings.

Referring by letter to the drawings, A A' designate the seat-sections, normally arranged in a horizontal plane and pivoted together, as presently described, to adapt one of said sections to be turned up into a vertical plane in rear of the other section, and thus provide a back thereto against which the occupant of the vehicle may rest.

The section A is provided at its rear edge with a lug, $a$, and the section A' is provided at its front or lower edge with a bifurcated lug, $a'$, the arms of which are adapted to embrace the sides of the lug $a$, and be pivotally connected thereto, by pins or otherwise, as at $a^2$, thus providing a simple and strong connection between the seats. The rear section, A', is adapted to fold into a vertical position to provide a back to the front section, A, which in this connection remains in a horizontal position and serves as the seat proper, said section A' having braces pivotally connected thereto, the braces consisting of two bars, B B, arranged at each side thereof, and pivoted at one end to the section A', and at the opposite end to the frame-work of the vehicle to which the device is applied.

The section A' is adapted to slide back and forth on ways, or the frame of the vehicle, as may be determined. In the drawings hereto annexed I have shown my invention as applied to a vehicle of the class known as "road-carts," which are provided with but two bearing-wheels.

I will now proceed to describe the application of the device to vehicles of the class described; but it is obvious that it can be applied and used in other relations with equal advantages.

C designates the body of the vehicle; D, the axle; E, the bearing-wheels; F, the springs, and G the shafts, the several parts being arranged and connected in the ordinary well-known or any preferable manner. In the cart or vehicle shown the shafts are arranged above the body of the vehicle, and the springs are connected directly to the shafts and the axle, as shown; but other arrangements can be provided without departing from the principle of my invention.

The section A' is provided with a board, $b$, covered and finished in any preferable manner, and supported at its ends by blocks or standards c, which in the vehicle shown in Fig. 2 bear upon the shafts, or continuations thereof, and are adapted to slide back and forth thereon, to allow the section A' to lie in a horizontal or a vertical position.

On its under surface the seat-section A is provided with right or other angled plates, H, suitably secured thereto at its ends, the vertical portions h h of which project below the edges of the blocks c, and fit in grooves or cut-away portions d, formed on the inner surfaces of the shafts or other part of the vehicle, on which the section A is adapted to slide.

e e designate plates fitted against the inner surfaces of the shafts over the grooved portions d d therein, said plates fitting in recessed portions e' therein, so as to lie flush with the face thereof, as is obvious. The plates e e are provided with slots f f, equal in length to the distance which the seat-section A is adapted to slide.

I designates a thumb-screw having a bead, i, and a threaded shank, i', which passes through the slots f f in the plates e e, and works in a threaded recess or opening, g, in the vertical portion h h of the plates H, and is adapted to bind upon said plates e e, and thus hold the section A from movement.

In applying my device to vehicles of the road-cart class herein shown, the seat-sections are arranged at the middle of the body of the vehicle, and when in a horizontal position the sections lie on opposite sides of the plane of the axle, to maintain an equilibrium between the front and rear ends of the body and on each side of the axle thereof. The device in this position is used as a double seat, and the vehicle can carry twice the number of occupants ordinarily carried by carts at present in use, the occupants facing in opposite directions or seated back to back.

When it is desired to employ one of the sections A A' as a back to the other, the front section is forced backward and the rear section at the same time is elevated, causing them to occupy the positions indicated in dotted lines in Fig. 1, and in full lines in Fig. 2, the thumb-screws having first been loosened, and when the seat is forced back sliding in the slotted plates with the plates H. When the sections are in this position, and as shown in Fig. 2, the section A, that forms the seat, is directly over the axle, so that a line drawn through the middle of the axle will fall through the middle of the seat, as indicated by the dotted line x in Fig. 2, thus maintaining the vehicle body and seat in equilibrium. The brace-rods B permit the sections to move and assume the relative positions described, being pivotally connected to the section A', which it braces in a very firm manner.

The upper surfaces of the sections can be finished in any preferable manner, and can be held at any angle other than a right angle by simply fastening the thumb-bolts H at the desired position on the plates e e, as is obvious.

In lieu of the means shown and described herein for fastening the seat A, any other device for accomplishing the same purpose may be employed, and when the device is applied to vehicles other than those of the class described the lower ends of the brace-rods B can be caused to slide forward, in lieu of the seat-section A, and held in any desired position by a suitable device. I would therefore have it understood that I do not limit myself to the exact construction shown and described, but hold myself at liberty to make such changes and alterations as fairly fall within the scope of my invention, the essential feature of which is a seat composed of two sections pivoted together and adapted to be arranged at different angles to each other, as clearly shown and described.

The operation of my invention is obvious from the foregoing description, taken in connection with the drawings.

I am aware that heretofore it has been proposed to provide a vehicle-seat having a back pivotally connected thereto, and hence I do not claim this construction, broadly. In my device the front seat is adapted to slide back and forth, and the position thereof determines the position of the rear seat or section, which is pivotally connected thereto, and is provided with a locking device for holding it at an angle, as hereinbefore fully described.

I am also aware that it is not new to provide two sets of seats divided longitudinally and adapted to slide independently of each other.

Having thus fully described my invention, what I claim as new, and desire to secure by Letters Patent, is—

1. In a vehicle-seat, the combination of the sliding seat-section, a back section pivotally connected thereto and adapted to lie in a horizontal position in line with or at right angles to such front section, according to the position thereof, and a locking device for holding the section in position, as set forth.

2. The combination, with the back section, of a sliding seat-section pivotally connected to the back section, and a locking device carried by said sliding section, adapted to clamp the same in position and maintain the back section at an angle thereto, substantially as described.

3. The combination, with the sliding section, of a back section pivotally connected thereto, brace-rods connected to the back section and the vehicle, and a locking device carried by said sliding section and adapted to hold the back section at an angle thereto, substantially as described.

4. In a road-cart, the combination, with the body and axle thereof, of a seat made in two sections, pivotally connected together, and adapted to be arranged at an angle to each other, the line of gravity of said seats falling through the axle when in their folded position, substantially as and for the purpose described.

5. In a vehicle, the combination, with the recessed side bars, of a seat made in two sections, pivotally connected together, brace-rods connected to the rear folding section, and plates, as H, connected to the sliding section, and carrying thumb-screws to clamp the section in position, substantially as described.

6. In a vehicle, the combination of the sliding section A, a back section, A', pivotally connected thereto, brace-rods B, connected to the back section, slotted plates $e\ e$, secured to recessed side bars of the vehicle, a plate, H, secured to the sliding seat-section and working in said recesses of the vehicle-bars, and clamping-bolts I, working in the slotted plates and apertures of the plates H, substantially as described.

In testimony that I claim the foregoing as my own I have hereto affixed my signature in presence of two witnesses.

GEORGE W. PAYNE.

Witnesses:
 PETER WALTERS,
 STEPHEN WILSON.